Figure 1A:
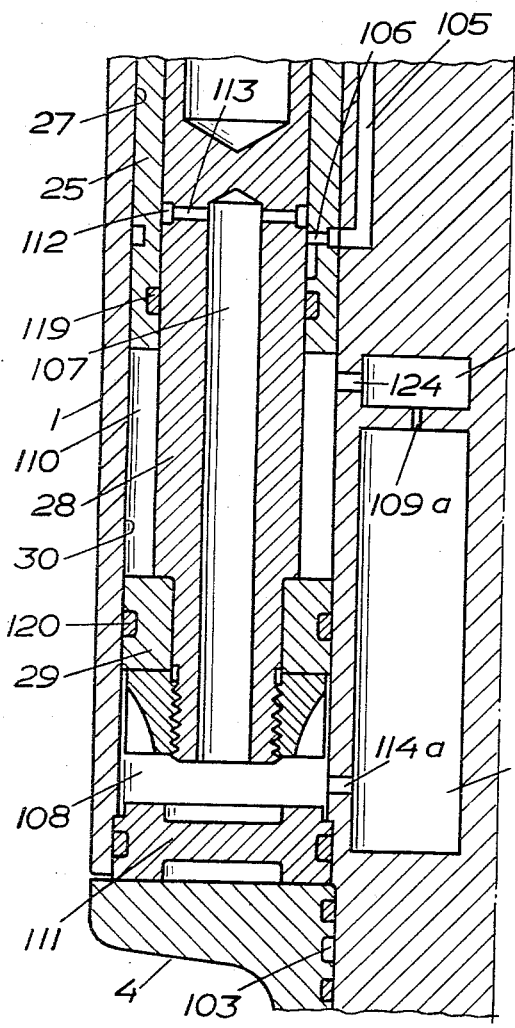

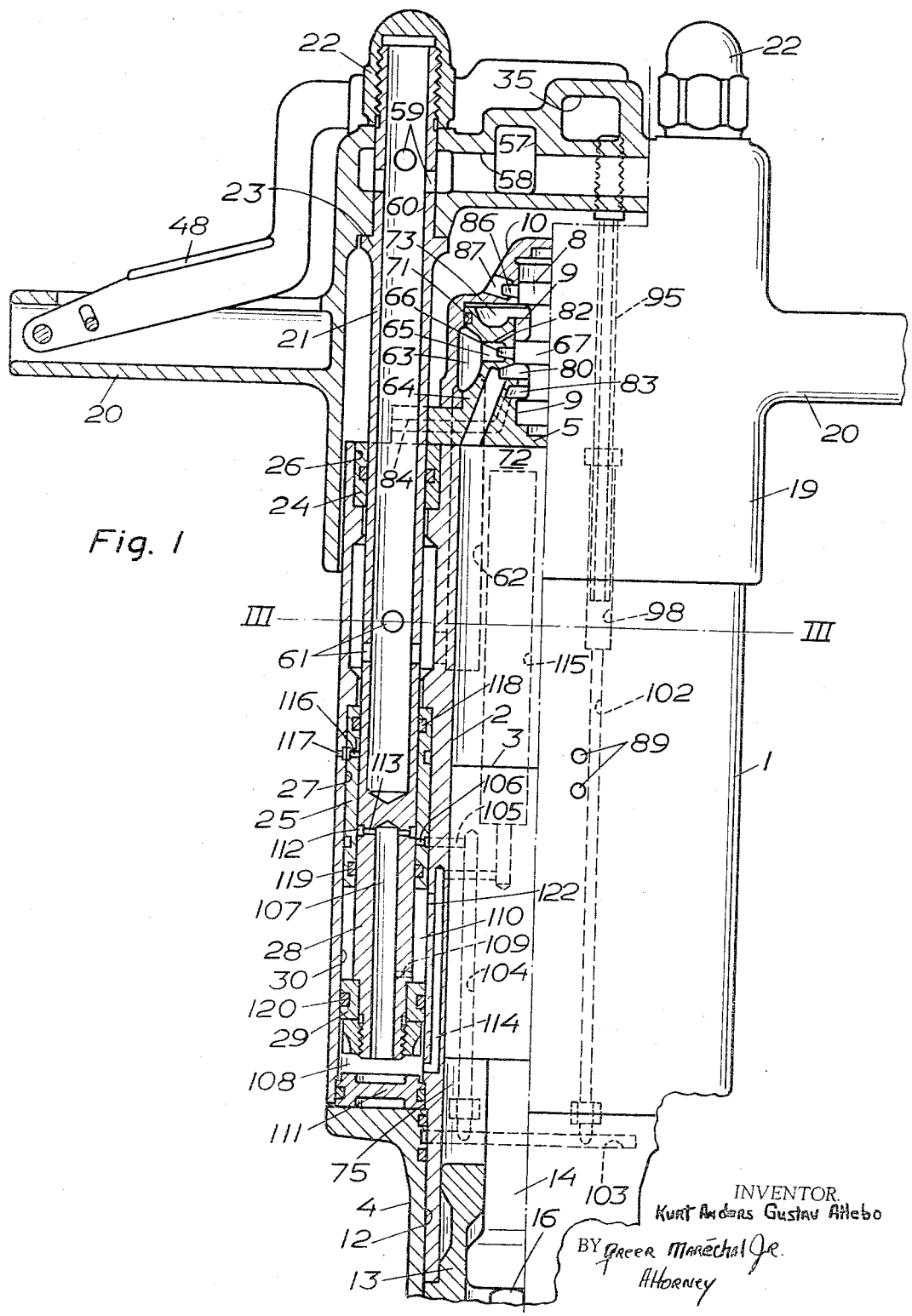

Feb. 28, 1967 K. A. G. ATTEBO 3,306,172
MEANS FOR TRANSMITTING FORCE BETWEEN AN
OSCILLATING AND A DESIRABLY STEADY
MEMBER OF AN APPARATUS
Filed July 13, 1964 5 Sheets-Sheet 2

INVENTOR.
Kurt Anders Gustav Attebo
BY Greer Marechal Jr
Attorney

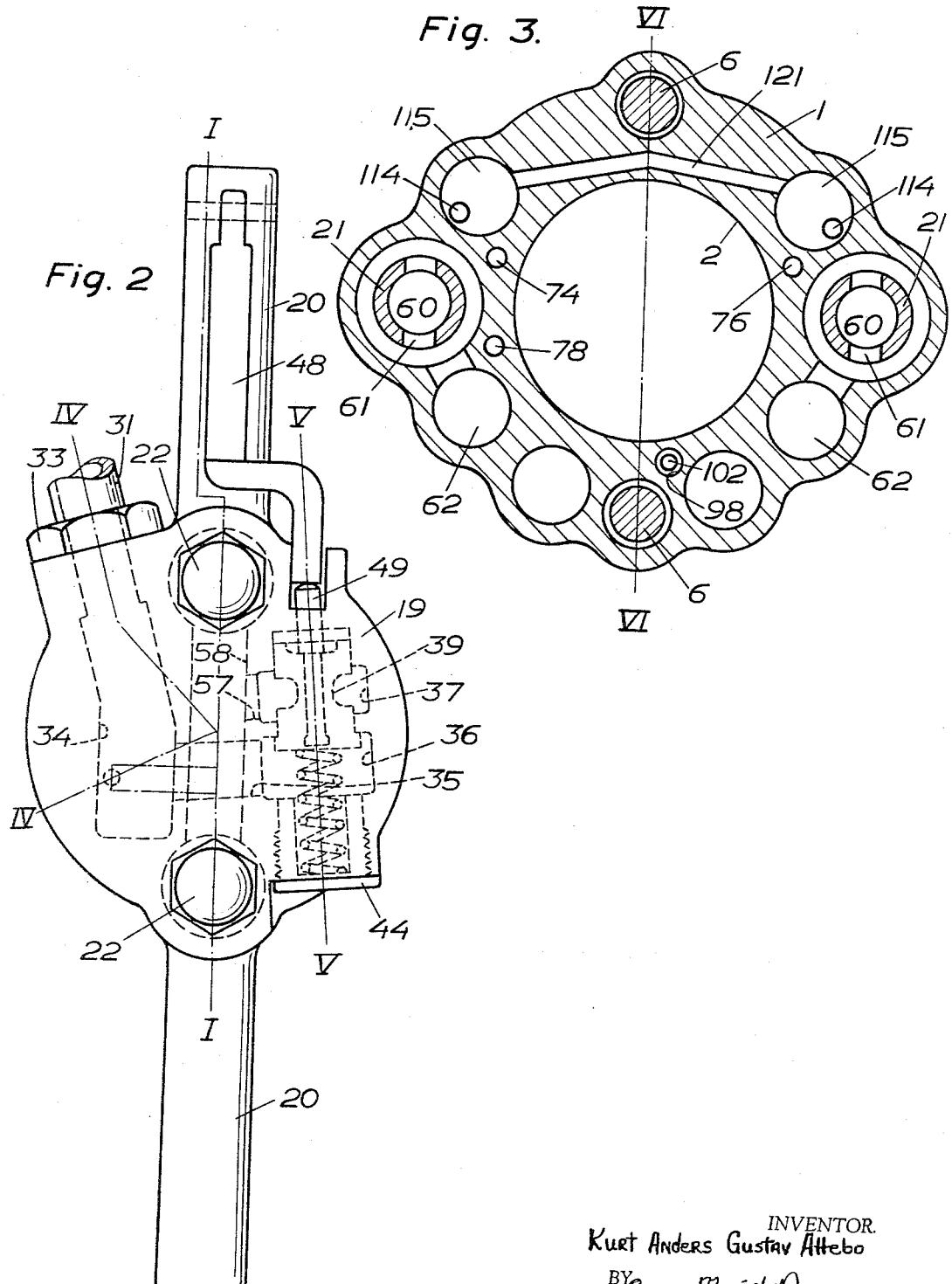

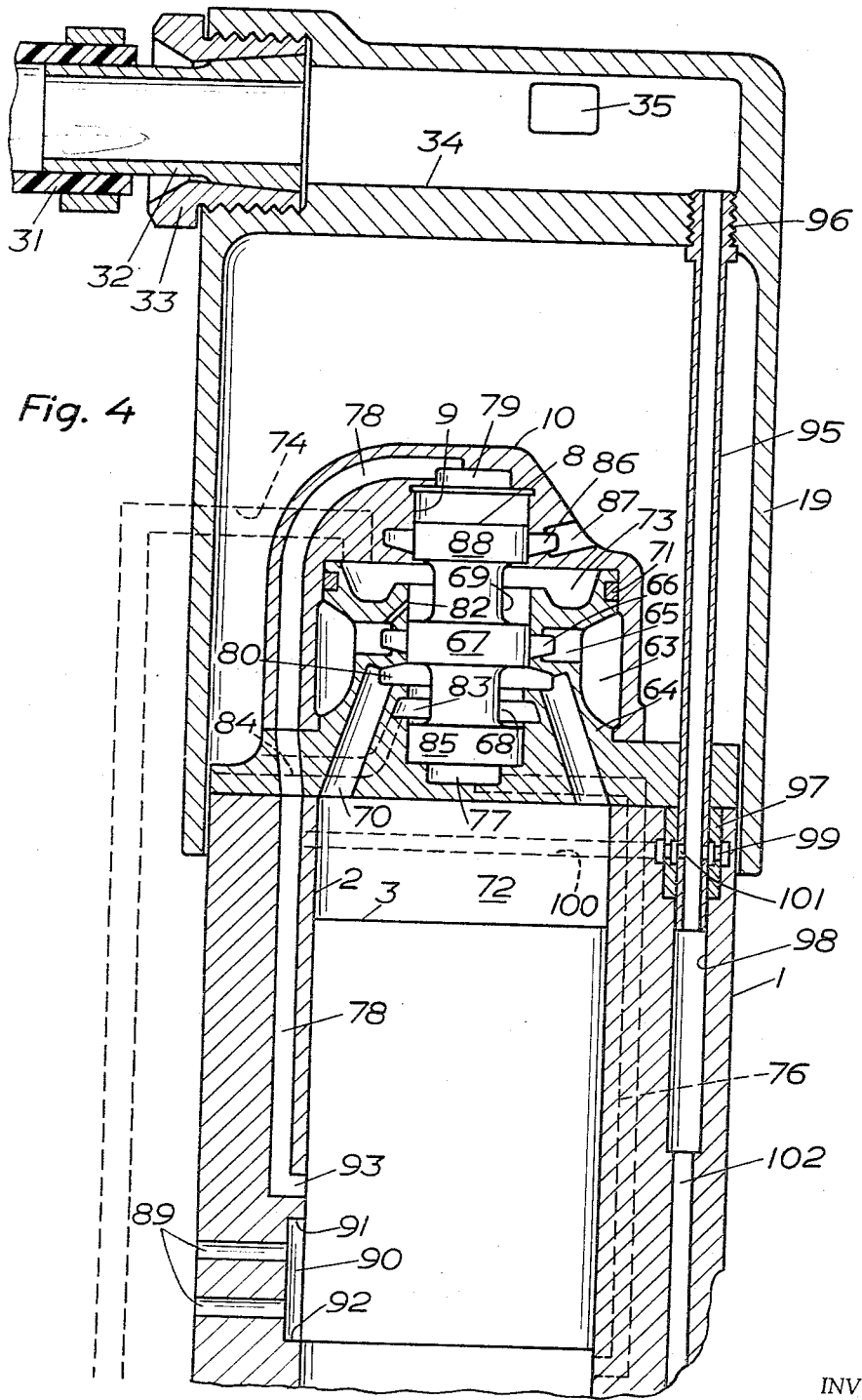

United States Patent Office 3,306,172
Patented Feb. 28, 1967

3,306,172
MEANS FOR TRANSMITTING FORCE BETWEEN AN OSCILLATING AND A DESIRABLY STEADY MEMBER OF AN APPARATUS
Kurt Anders Gustav Attebo, Barkarby, Sweden, assignor to Atlas Copco Aktiebolag, Nacka, Sweden, a corporation of Sweden
Filed July 13, 1964, Ser. No. 381,953
10 Claims. (Cl. 91—283)

One object of this invention is to provide improved means for reducing or eliminating the transmission of vibrations to one part of the apparatus produced by a vibratory or oscillating member or element movable relative to said part of the apparatus. The oscillating or vibratory member or element as well as the desirably steady member may naturally each per se be one piece unitary members or complex members formed by a small or large number of parts. An apparatus according to the invention may comprise a percussion tool having a handle member and a cylinder housing forming a working cylinder in which a hammer piston is reciprocable under the action of pressure fluid. The invention may also be employed in apparatus comprising a vehicle having ground engaging elements, such as wheels, which during the operation of the vehicle vibrate or oscillate relative to the body and other parts of the vehicle. In apparatus of the types indicated above a member is provided in which the occurrence of vibration is undesirable. Such member may, for instance, be the handles or a handle carrying member or other carrier of a percussion tool, particularly a portable tool, or the body of a vehicle, for instance of an automobile. Common for the above indicated apparatus is also that some means is provided for transmitting force between the steady member in which the occurrence of vibration is undesirable and an oscillating member such as a casing or housing or piston or other body associated with said member.

One object of the invention is to reduce the necessary movement of said handle or steady member relative to said oscillating member when greatly varying force transmission occurs between the steady member and said oscillating member. A further object of the invention is to automatically adjust the force transmitting capacity of the means which transmit force between the steady member and the oscillating member, for instance the casing or housing or body or the like. A further object is to cause the oscillating member to oscillate around a mean position relative to the steady member in which vibration is undesirable, which mean position remains substantially uninfluenced by the force transmitted through the force transmitting means. A still further object of the invention is to avoid a tendency of motoring which may occur between said steady member and the casing or housing. A still further object of the invention is to provide a simple percussion tool in which the transmission of vibrations to the handles or the handle structure is eliminated or reduced to a great extent.

Another object of the invention is to provide in combination with a percussion tool of the type described a percussion motor in which the return stroke of the hammer piston is carried out with less speed than the working stroke so that the number of strokes is reduced, this being particularly important in connection with percussion tools in which the power per stroke is great, such as large concrete breakers, pile hammers, and the like. A still further object of the invention is to provide simple and efficient means for supplying air to a percussion motor during operation of the tool. A further object of the invention is to use means for guiding the handle member relatively to the cylinder housing of a percussion tool for said air supply purpose.

In connection with portable percussion tools it has been proposed to reduce vibration transmission to the handle or handles by provision of a handle member or handle structure in which a cylinder housing is movable axially within certain limits. In one embodiment disclosed in 1931 by Benedict in U.S. Patent 1,792,888 the cylinder housing is movable between an air cushion or air spring which is nonadjustable and an air body the pressure of which is kept substantially constant and is substantially equal to the pressure in the compressed air network connected to the tool. In another embodiment disclosed in 1956 by Salengro in U.S. Patent 2,762,341, FIG. 11, the cylinder housing is forced towards the working implement by substantially constant net work air pressure acting on a reduced area of the cylinder housing and an air cushion or air spring acting on another area of the cylinder housing and the tension of which is increased automatically by supplying compressed air through a valve controlled port to said air cushion when the feeding force is increased.

In one embodiment of applicant's apparatus the force transmitted from the handle member to the cylinder housis automatically regulated to correspond to the force applied by the weight of the handle member and by the operator on the handles within the practical limits of operation. This is achieved by regulating automatically the differential between the force transmitted to the cylinder housing by the air pressure in one elastic air body counteracting the feeding force and a counteracting force of a second air body which may also be automatically regulated so that the resulting force substantially corresponds to the momentary value of the force applied through the handle member of the tool. This is achieved according to the invention by means for automatically supplying pressure fluid to increase the pressure in the elastic fluid body or bodies corresponding to increases in the transmitted force. Similarly elastic fluid is automatically exhausted or vented from the elastic fluid body or bodies to reduce the pressure therein in response to reductions of the transmitted force. It is a clear advantage of the invention that elastic pressure fluid is not consumed by the mechanism for reducing vibration transmission to the handle member or the like as long as the transmitted force is substantially constant.

It has been suggested by Holdo in U.S. Patent 3,010,431 to provide a percussion tool in which an air body transmits feeding force from a handle member to a cylinder housing reciprocable relative to the handle member throughout the operation of the tool and in which said body is in constant communication with a compressed air source and in controlled communication with the atmosphere through an air outlet which is controlled by the oscillations of the cylinder housing relative to the handle member for bleeding more or less air from said body corresponding to a small or a great feeding force applied through the handle member. In Holdo's device a considerable amount of air passes through the vibration reduction chambers throughout the operation of the tool until the feeding force is so large that the outlet from said chambers is closed in which situation the adjustable air cushion serving for vibration reduction or elimination in Holdo's tool is changed to a non-adjustable air cushion or air spring. In the present invention as above indicated the consumption of compressed air for vibration reduction or elimination purposes during operation of the tool is reduced to a minimum since compressed air is only expelled to the atmosphere from the mechanism for reducing vibration transmission, when the feeding force is reduced, and compressed air is supplied to said mechanism when the feeding force is increased, but is negligible as soon as the tool operates under normal conditions with substantially constant feeding force.

In the tool according to the present invention the cylinder housing oscillates around a substantially unchanged mean position during operation of the tool irrespective of the feeding force transmitted through the handle member.

This means that the necessary distance for axial movement of the cylinder housing relative to the handle member is less than in Holdo's tool. This is of practical importance in connection with the handling of a tool, for instance a concrete breaker, and also in other combinations if the invention is used, for instance, for vibration reduction in a vehicle.

Figure 6:
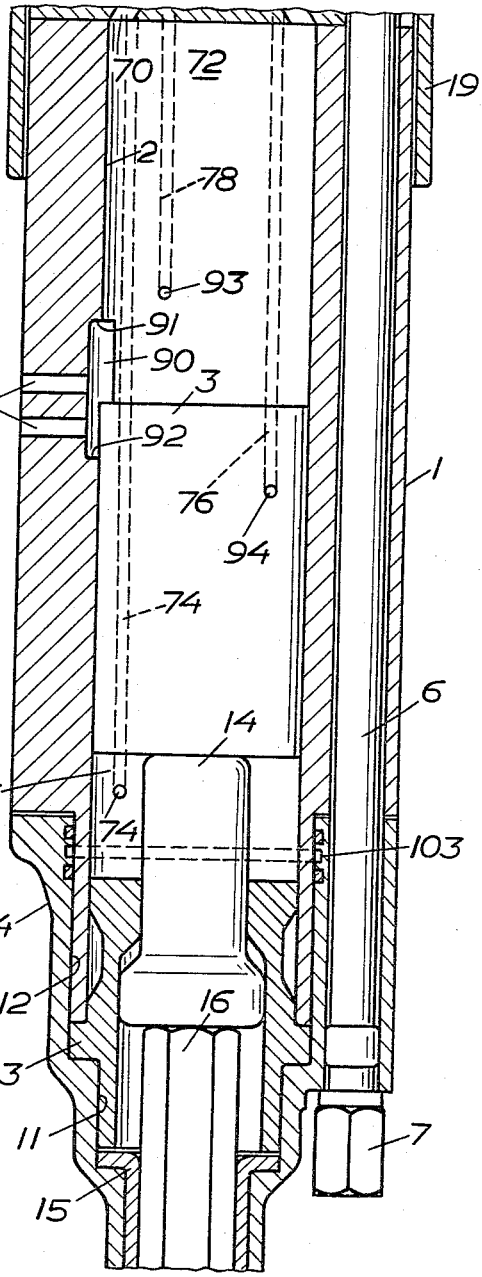
Figure 5:
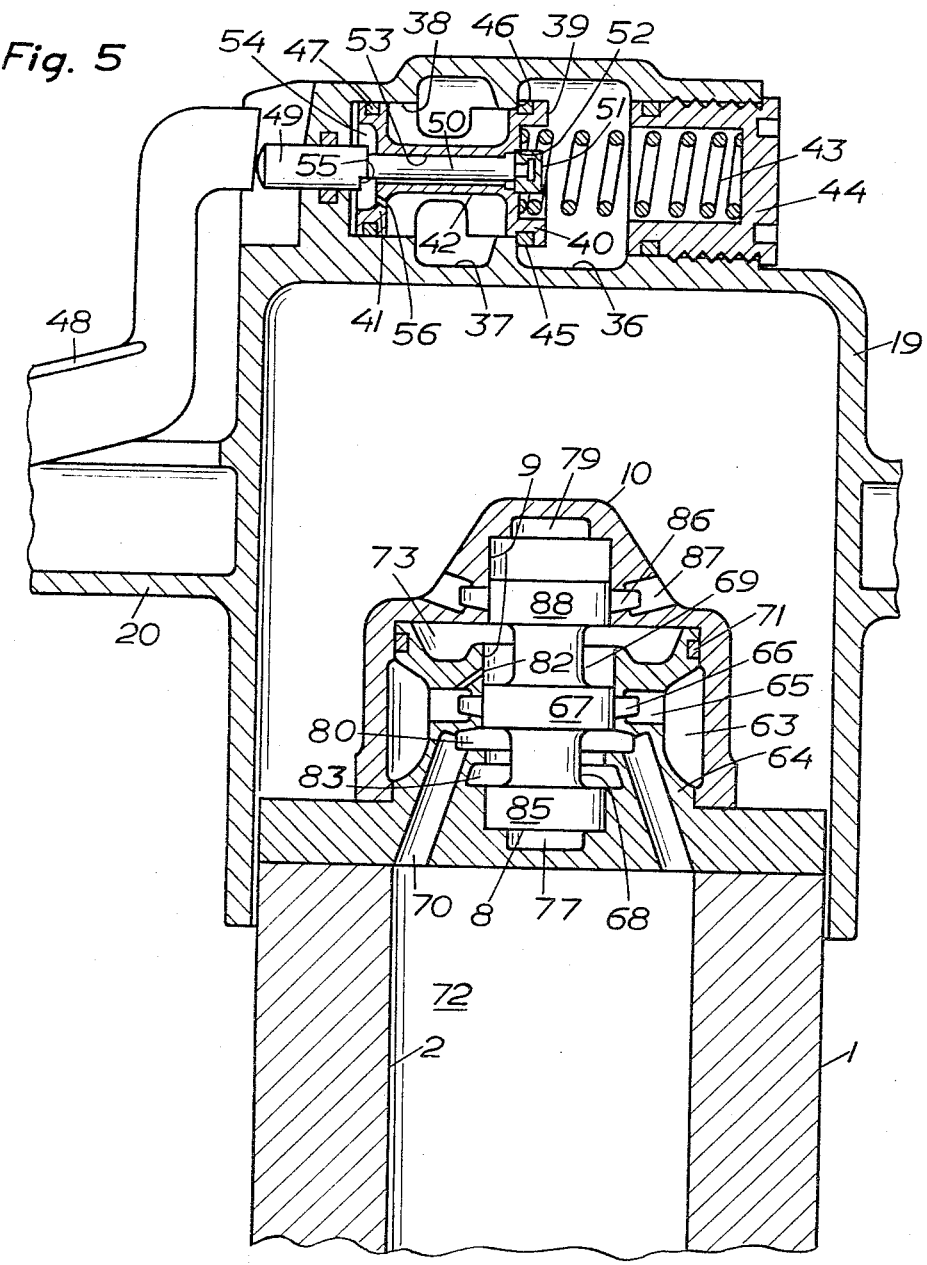

In the accompanying drawings one embodiment of a percussion tool according to the invention is illustrated by way of example together with one modification. FIG. 1 is a partial side view and longitudinal section on a plane through the handles and the cylinder axis of the working cylinder of a concrete breaker according to the invention, the section being substantially through the left half of the tool only and the front end and tool retainer as well as a portion of the right handle being cut away. FIG. 1a is a partial section similar to FIG. 1 and shows a modification of the vibration reduction mechanism. FIG. 2 is a top view of the tool illustrated in FIG. 1. FIG. 3 is a transverse section on lines III—III in FIG. 1 on a somewhat larger scale than in FIG. 1. FIG. 4 is a longitudinal section of the upper part of the tool on a somewhat larger scale than FIG. 1 and substantially on lines IV—IV in FIG. 2, and FIG. 5 illustrates the valve mechanisms of the tool illustrated in FIGS. 1–4, FIG. 5 being a longitudinal section of the upper part of the tool partly on lines V—V in FIG. 2 and partly through the cylinder axis and also on a somewhat larger scale than FIG. 1. FIG. 6 is a longitudinal axial section of the tool in FIG. 1 taken substantially on line VI—VI in FIG. 3.

The percussive tool illustrated in FIGS. 1–6 has a housing 1 in which is formed a working cylinder 2 for a hammer piston 3 which is reciprocable in the working cylinder under the action of pressure fluid. The cylinder housing 1 is provided with a front casing 4 and a rear casing 5 which are held together with the cylinder housing by means of two longitudinal bolts 6 and nuts 7. The rear casing 5 together with a cover 10 form a valve casing in which a distribution valve member 8 is movable in bores 9 the rear end of which is closed by the cover 10 which is secured to the rear casing 5 by suitable means such as bolts (not illustrated). The front casing 4 has bores 11 and 12 in which a guide member 13 for an anvil block 14 is fitted. The front casing also contains a chuck bushing 15 in which the shank 16 of a working tool, such as a concrete breaker chisel, may be inserted. The working tool is retained in the bushing 15 by a tool retainer of conventional design (not shown).

The illustrated percussion tool is provided with a handle member 19 which carries two handles 20, 20. The handle member 19 and the cylinder housing 1 are guided for relative longitudinal reciprocation within a limited distance by means of two guide tubes 21 secured to the handle member by means of nuts 22 and shoulders 23 on the guide tubes which are pressed against the handle member as obvious from FIG. 1. The tubes 21 are guided in bushings 24 and 25 fitted in bores 26 and 27, respectively, in the cylinder housing 1. The lower ends of the guide tubes form differential pistons 28, 29 reciprocable in two cylinders 30 in the housing 1. The guide tubes 21 also form supply passages for compressed air to the hammer motor of the tool which in the illustrated embodiment is a compressed air driven tool, but it should be understood that the invention may be applied to other tools such as hydraulic tools provided with elastic fluid vibration reduction means according to the invention.

Compressed air is supplied to the tool through a hose 31 which is connected to the handle member by means of a fitting 32 retained in the handle member 19 by means of a retaining nut 33. The compressed air flows from the hose 31 through a passage 34 in the handle member and a transverse passage 35 to a space 36, FIG. 5. The space 36 and a further space 37 in the upper portion of the handle member 19 form together with a bore 38 a compartment in which a main valve member 39 of the spool type is movable. The valve member 39 has two heads, one large head 40 and a small head 41 one at each end on a stem 42. A spring 43 which is retained in a spring retainer 44 fitted at the end of the bore 38 normally keeps the valve member 39 with its large head 40 and a sealing ring 45 against a seat 46. The valve member 39 has a further sealing ring 47 on the small head 41 which forms a seal with a portion of the bore 38. The main valve is of servo type. The valve member 39 is operated by means of a trigger 48 provided and mounted on one of the handles 20. The trigger actuates a spindle 49 which extends with a reduced portion 50 through the stem 42 of the member 39 and carries an auxiliary valve head 51 which cooperates with a seat 52 formed at the right hand end of the stem 42 in FIG. 5. The reduced portion 50 is carried through a bore 53 in the stem 42 with clearance so that air may pass from the space 36 to a space 54 to the left of the small valve head 41. The spindle 49 has a recess 55 inside the small valve head 41 which communicates the clearance in stem 42 with the space 54 and the small valve head 41 has a restricted bore 56 for bleeding air from 54 to 37. When the spindle 49 is moved to the right in FIG. 5 by the trigger 48 compressed air in 36 which normally keeps the valve member 39 in closed position is admitted to space 54 through the clearance around reduced spindle portion 50 so that the operator may easily move the main valve member 39 to open position. When the trigger is released the spring 43 and the air pressure in space 36 move the valve member 39 to the left in FIG. 5 and the air remaining in the space 54 then escapes through the restricted bore 56 to the space 37. The arrangement of the valve 39 makes it possible to operate this comparatively large valve with very little effort.

From the space 37 passages 57 and 58 and openings 59 in the guide tubes 21 lead to a passage 60 in the guide tubes and further through openings 61 in the guide tubes to passages 62 in the cylinder housing 1 which communicate with an annular space 63 formed between the valve casing cover 10 and a boss 64 on the rear casing 5. The boss 64 has a part of the bores for the valve 8 formed therein and is sealed against the valve casing cover 10 by a sealing ring 71. In the various figures the distributing valve member 8 is always in its low or forward position. The boss 64 has a number of radial bores 65 which communicate the annular space 63 with an annular groove 66 which in the illustrated position of the valve member is covered by a land 67 of the valve member 8. The valve member 8 has two annular grooves 68 and 69 and the groove 68 always communicates through an annular groove 80 and bores 70 with the rear working cylinder chamber 72 at the upper end of the hammer piston 3. The annular groove 69 always communicates with an annular space 73 formed between the boss 64 and the cover 10 and communicating through a passage 74 with the front end working chamber 75 for producing the return stroke of the piston 3.

A passage 76 in the cylinder housing communicates the front chamber 75 with a space 77 at the front end of the valve member 8 for moving the valve member in position for the working stroke, and a further passage 78 in the cylinder housing and the valve casing and cover communicates with a space 79 at the rear end of the valve member 8 and communicates the chamber 72 with the space 79 for moving the valve member 8 to the front position illustrated in the various figures. In the lower or forward position of the valve member 8 the annular groove 66 communicates with the annular groove 69 through a restricted or a number of restricted passages 82. The boss 64 is provided with an annular groove 83 which in the forward position of the valve member 8 communicates with a passage 84 leading to the atmosphere. The groove 83 is controlled by a land 85 on the valve member 8, so that in upper position of the valve member 8 the land 85 covers the groove 83. An annular groove 86 in the cover 10 communicates with the atmosphere through a number of bores 87 and the groove 86 is controlled by a land 88 on the valve member 8 so that in the forward position of the valve member the land 88 covers the groove 86 whereas in the rear position of the valve member the groove 86 communicates with the groove 69 in the valve member 8.

The cylinder housing 1 is provided with a number of exhaust openings 89 which communicate with a recess 90 in the inner wall of the cylinder bore. The recess 90 has a rear edge 91 and when the piston uncovers said edge during the working stroke the exhaust from the working chamber 72 starts. Similarly the exhaust of the return stroke chamber 75 starts when the piston on its return stroke uncovers the forward edge 92 of the recess 90. A port 93 forming a communication between the passage 78 and the cylinder bore is uncovered by the piston 3 towards the end of the working stroke so that compressed air in the chamber 72 can flow through the passage 78 to the space 79 and move the valve member 8 downwards to the position illustrated in FIGS. 4 and 5 in which a restricted air flow is obtained through the passage 82, the groove 69, the space 73, and passage 74 to the cylinder chamber 75. The air cushion in the chamber 75 together with the air supply through the passage 74 returns the piston with reduced speed towards the back head. When the piston during the return stroke uncovers a port 94 compressed air from the chamber 75 flows through the passage 76 to the space 77 and moves the valve member 8 towards the cover 10 so that the admission to the chamber 72 is opened. In the upper position of the valve member 8 compressed air is supplied from the annular space 63 through bores 65, annular groove 66, annular space 68 and bores 70 to the rear chamber 72 of the working cylinder.

The illustrated tool is provided with means which prevent operation of the hammer motor when the handle member 19 is lifted with regard to the cylinder housing 1. This means consists of a tube 95 which is fixed in the handle member 19 at 96 and communicates with the space 34 in the handle member and with the compressed air supply hose 31.

The tube 95 is slidable in a bushing 97 and a bore 98 in the cylinder housing 1. The bushing 97 has a number of ports 99 which communicate through a passage 100 with the passage 78 leading to the rear end of the valve member 8 and the space 79. The tube 95 has a number of ports 101 which in the position illustrated in FIG. 4, in which the handle member 19 is retracted, register with the ports 99 so that compressed air can flow from the space 34 through the tube 95, the ports 99 and 101, the passages 100 and 78 to the space 79 at the rear end of the valve member 8. In this position live compressed air is consequently applied to the upper end of the valve member 8 keeping the valve member in the forward position illustrated in FIG. 4. In this position of the handle member the pressure in the cylinder chamber 75 is therefore incapable of moving the valve member 8 towards the rear in the valve housing and the valve member remains in the position illustrated in FIG. 4 in which the piston is just about to open the outlet at the edge 92 and the percussion motor is consequently not operable. The mechanism for making the percussion motor inoperable when the handle member is lifted is the subject matter of a copending application Serial Number 182,126, by C. O. L. Ottosson et al. entitled "Means for Preventing Idle Operation of Percussion Tools" and forms no part of this invention.

The bore 98 in the housing 1 is continued by a bore 102 which communicates with a transverse passage 103 leading to a bore 104 communicating with a passage 105 and a fairly large port 106 through which compressed air may be supplied to the cylinder 30. The differential piston 28, 29 has an axial bore 107 which communicates with a large chamber 108 at the lower end of the piston 28, 29 and through a restricted passage 109 with a small annular chamber 110. A shock absorber 111 of elastic material such as rubber, nylon or the like may be provided at the bottom of the bore 30 to prevent destructive impacts of the piston 28, 29 against the bottom of the bore 30. An annular groove 112 in the periphery of the small piston 28 communicates with the bore 107 through a number of bores 113. When the handle member 19 is depressed from the position illustrated in FIG. 1 the groove 112 registers with the port 106 so that compressed air is supplied to the passage 107 and the chambers 108 and 110. The chamber 108 communicates through wide passages 114 with air magazines 115 which are filled with compressed air from the chamber 108 when the chamber 108 is brought into communication with the port 106. The passage 109 may be replaced or complemented with a passage 122 leading to the bore 114. The guiding bushing 25 is provided with an outlet passage 116 which communicates with a fine restricted outlet passage 117 in the housing 1 leading to the atmosphere. A sealing ring 118 prevents air from the air supply to the hammer motor to reach the vibration reduction mechanism. A further sealing ring 119 in the bushing 25 prevents air from escaping from the chamber 110. A still further sealing ring 120 seals between the chambers 108 and 110. The sealing rings 119 and 120 may be dispensed with and also the restricted passage 109 may be eliminated if suitable and controlled clearance is provided between the piston 29 and the bore 30. The air magazines 115 are interconnected through a large transverse passage 121.

The above described tool operates in the following manner:

When the hose 31 has been connected to a compressed air network and the air pressure has been turned on then compressed air flows from the hose 31 into the chamber or passage 34 to the tube 95. Assuming that the handle member has not been raised by the operator the tube 95 is in its lower position in FIG. 1, in which tube 95 is not in communication with passages 100 and 78 but communicates with bores 98 and 102 so that compressed air flows through said bores and the transverse passage 103, axial passage 104 and passage 105 to port 106. With the handle member 19 in the lower position the annular groov 112 registers with port 106 so that compressed air flows into axial bore 107 and fills chamber 108 and magazines 115. Compressed air also flows from bore 107 through the restricted passage 109 or the clearance between piston 29 and bore 30 to the annular chamber 110.

As soon as a certain air pressure, for instance 1.5 atmospheres above atmospheric, has been built up in the chambers 108 and magazines 115 the handle member 19 is raised from the cylinder housing 1 to the position illustrated in FIG. 4 in which air supply to the chambers 108, 110 is interrupted since the annular groove 112 moves out of register with the port 106. In the raised position of the handle member 19 ports 101 in the tube 95 on the other hand register with ports 99 in the bushing 97 so that live air flows through the passages 100 and 78 to the space 79 at the rear end of the distributing valve member 8. The live air in space 79 keeps the distributing valve member 8 in the low position illustrated in FIGS. 1, 4 and 5. In this position of the distributing valve member 8 the rear chamber 72 is vented to the atmosphere through the bores 70, annular groove 80 in the boss 64, annular groove 68 in the distributing valve member 8, annular groove 83 in the boss 64, and the vent passages 84. The hammer piston 3 consequently rests on the anvil block 14, as illustrated in FIG. 1.

Now, when the operator in this position of all parts of the tool presses the trigger 48, compressed air flows from hose 31 and passage 34 through transverse passage 35 to main valve space 36 through the clearance between reduced portion 50 and bore 53 to space 54 behind main valve member 39. The air pressure in the space 54 then enables the operator to move the main valve member towards the right in FIG. 5 against live air pressure in the valve space 36 and the spring 43. Compressed air is then admitted from the valve space 36 to space 37, large passages 57, 58, large openings 59, passages 60 in the guide tubes 21, ports 61, and passages 62 to the annular space 63 between the boss 64 and the valve casing cover 10. From the annular space 63 compressed air flows through radial bores 65 and restricted passage 82 to annular groove 69, space 73 and passage 74 to front end chamber 75 in the cylinder housing below hammer piston 3. This raises the hammer piston to the position illustrated in FIG. 4 but as long as the handle member has not been depressed operation of the hammer motor is prevented.

Now, if the operator wants to bring the hammer motor into operation he only has to depress the handle member 19 and to press the trigger 48. The communication between the tube 95 and the passage 100 is then first interrupted since the port 101 does not more register with the port 99 and the tube 95 is moved down in the bore 98. The compressed air supply to space 79 is interrupted and compressed air in the front chamber 75 flowing through port 94, passage 76 to space 77 lifts the valve member 8 to the upper position. This starts operation of the hammer motor. The working chambers 72, 75 behind and in front of the hammer piston 3 are vented to the atmosphere through the distributing valve member 8 and vent passages 84 and 87, respectively, as well as through the recess 90 and the outlet openings 89. The position of the ports 93, 94 as well as the restricted supply of compressed air to the chamber 75 through the passage 82 causes the hammer piston 3 to make a relatively slow return stroke so that impact of the hammer piston on the rear casing 5 is avoided. The number of strokes of the tool is thereby also kept at a desirably low value so that the operator can handle the tool and produce the necessary feeding force without being exposed to severe fatigue.

The vibration reduction or elimination mechanism operates in the following manner:

During the operation of the hammer piston in the working cylinder the rear casing 5 as well as at the front head or guide member 13 are subjected to varying air pressures in the working chambers 72 and 75, respectively, which air pressures produce oscillation of the cylinder housing 1. It is naturally desirable to avoid as much as possible that the oscillations of the cylinder housing 1 are transmitted to the handle member 19 and the handles 20. For this purpose the feeding force from the handle member 19 and the handles 20 is transmitted to the cylinder housing 1 by the pistons 28, 29 through compressed air bodies in the two pairs of chamber 108, 108 and 110, 110. During operation of the tool and the consequent oscillations of the cylinder housing 1 the air pressure in the chambers 108 remains substantially constant as long as the feeding force is substantially unchanged due to the fact that the chambers 108 are connected through wide passage 114 with the relatively large air magazines 115. Said magazines may, for instance, be at least 5 times the swept volume of the pistons 28, 29. Since the chambers 110 communicate with the chambers 108 through the fine bores 109 or suitable clearances around the big pistons 29 the air pressure in the air bodies in 110 follows with a certain delay the air pressure in the chambers 108. The feeding force exerted by the operator must obviously be equal to the differential of the forces of the compressed air acting on the pistons 28, 29 and the opposite forces acting on the annular rear surfaces of the pistons 29. The air bodies in chambers 108 together with the air magazines 115 act as relatively soft springs with adjustable tension. If the operator increases the feeding force the air pressure in the chambers 108 and the air magazines 115 is insufficient to balance the increased feeding force. The pistons are consequently moved downwards in the cylinders 30 until the annular grooves 112 register with the ports 106 in which position compressed air is supplied from the compressed air network to the bores 107 and chambers and magazines so that the pressure in said chambers is raised to a value sufficient to balance the new feeding force executed by the operator. It is obvious that any leakage of air from the chambers 108, 110 will also automatically be compensated from the compressed air network if the air pressure or the mean air pressure in the chambers 108, 110 falls below a value which does not correspond to the feeding force produced by the operator.

Now, if the operator reduces the feeding force the compressed air in the chambers 108 would act to move the pistons 28, 29 upwards in the cylinders 30 and in doing so the annular groove 112 will be moved to a position in which it registers with the vent ports 116 so that air is vented from the chambers 108, 110 through the bores 107 and passages 113. The air pressure in the chambers 108, 110 is consequently reduced so that the differential of the air forces on the pistons 28, 29 again corresponds to the reduced feeding force produced by the operator.

It would be obvious from the above description that during normal operation of the tool when the operator produces a constant or substantially constant feeding force the chambers 108, 110 as well as the air magazines 115 are closed and no air is supplied to the chambers or escapes through the outlet or vent passages 116, 117. Consequently, as long as the operator does not change the feeding force the vibration reduction mechanism does not consume compressed air, except the quantity necessary to compensate for leakage. As soon as the operator increases the feeding force compressed air is supplied to the chambers 108, 110 from the compressed air network so that the mean pressure in the chambers and magazines corresponds to the new feeding force and when the operator releases the feeding force compressed air is drained off from the chambers 108, 110 and the air magazines 115 to reduce the mean pressure in said chambers and magazines to correspond to the reduced feeding force. During all these operations the oscillations produced by the varying air pressures in the working cylinder of the tool are not transmitted to the handle member which is only subjected to the substantially constant differential of the forces produced by the pressures in the chambers 108, 110 acting on the pistons 28, 29.

It is obvious that the volume of the air magazines 115 and the area of the passages 114 should be as large as possible. For practical purposes it has been found, however, that the volume of the air magazines 115 may be calculated so that the natural frequency of the system comprising the masses of the handle member 19 and the pistons 28, 29 and the masses connected to the handle member and the air springs formed by the air bodies in 108, 110, 115 should preferably by less than one third of the frequency of the exciting oscillation, i.e. the hammer piston percussion frequency. It may furthermore be noted that the operation with suitable dimensions of the air bodies in 108, 110, 115 the cylinder housing 1 oscillates relative to the handle member within close limits so that 112 remains between the ports 106 and 116 and oscillates around a mean position which lies between the ports 106 and 116 and which is moved very little due to the variations in feed pressure. According to the invention the amplitude of the handle member 19 with regard to the cylinder housing 1 upon variations in feed pressure is much lower than in previously known tools of similar design.

As long as the operator produces a certain feed pressure he may operate the hammer motor in conventional manner by means of the trigger but as soon as he lifts the handles and the handle member 19 to the position illustrated in FIG. 4, i.e. if he, for instance, wants to retract the tool out of the ground, the operation of the hammer motor is automatically interrupted. This arrangement prevents that the piston hits the front or rear heads during operation without feed pressure.

The embodiment of the invention above described should only be considered as an example and various modifications of the invention may naturally be made within the scope of the claims. In some tools, for instance, a single vibration reduction cylinder may be provided instead of the twin cylinders 39, 39 illustrated in the present embodiment. The magazines 115 may as illustrated in FIG. 1a be replaced by large magazines 115a connected to the chamber 108 by a wide passage 114a and a small magazine 115b connected to the chamber 110 by a wide passage 124 and a restricted passage 109a may be provided between the magazines 115a and 115b. Naturally the invention may also be employed in connection with other apparatus in which it is desirable to eliminate or reduce vibration transmission to a member to which vibrations would otherwise normally be transmitted from an unavoidably vibratory element. Such apparatus may for instance be automobiles or similar vehicles.

What I claim is:

1. In an apparatus with vibration reduction, a member in which the occurrence of vibration is undesirable, an oscillating element movable relative thereto, means associated with said member and said element for confining therebetween a first elastic fluid body having a normally closed inlet and outlet and adapted for transmitting a total force in one direction between said member and said element, and means on said member and on said element and associated with and cooperable with said inlet and outlet for automatically adjusting the pressure in said first elastic fluid body by opening selectively said inlet and said outlet, so as to keep said transmitted force relatively constant over a considerable number of successive oscillations of said oscillating element.

2. In an apparatus with vibration reduction, a member in which the occurrence of vibration is undesirable, an oscillating element movable relative thereto, a vibratory element movable relatively to said oscillating element, fluid cylinder and piston means associated with said member and said oscillating element and confining therebetween a first and a second elastic fluid body having a normally closed inlet and outlet for transmitting force between said member and said oscillating element corresponding to the differential in force produced by said bodies on said cylinder and piston means, and cooperating means on said member and on said housing and associated with said cylinder and piston means for automatically adjusting the pressure of the fluid in at least one of said bodies by selectively opening said inlet and said outlet so that said differential is kept relatively constant and corresponds to said transmitted force over a considerable number of successive reciprocations of said vibratory element.

3. In an apparatus with vibration reduction, a member in which the occurrence of vibration is undesirable, an oscillating housing movable relatively thereto, a vibratory element movable relatively to said housing, fluid cylinder and piston means associated with said member and said housing and confining therebetween a first and a second elastic fluid body having a normally closed inlet and outlet for transmitting force between said member and said housing corresponding to the differential in force produced by said bodies on said cylinder and piston means, and cooperating means on said member and on said housing and associated with said cylinder and piston means for automatically adjusting the pressure of the elastic fluid in said bodies by selectively opening said inlet and said outlet so that said differential is kept relatively constant and corresponds to said transmitted force over a considerable number of successive oscillations of said vibratory element.

4. In a percussion tool with vibration reduction, a cylinder housing, a working cylinder formed in said housing, a hammer piston reciprocable in said working cylinder under the action of pressure fluid, a member in which the occurrence of vibration is undesirable, said housing being slidably reciprocable a limited distance relative to said member in a feeding direction, elastic fluid cylinder and piston means carried by said housing and said member and confining therebetween a first and a second elastic fluid body for transmitting feeding force in said feeding direction between said member and said housing corresponding to the differential in force produced by the pressure on said cylinder and piston means of the elastic fluid in said bodies, and cooperating means associated with said cylinder and piston means for adjusting automatically the pressure of the elastic fluid in at least one of said bodies which transmits said feeding force by selectively opening said inlet and said outlet so that said differential is kept relatively constant and corresponds to said feeding force over a considerable number of successive reciprocations of said hammer piston.

5. In a percussion tool with vibration reduction, a cylinder housing, a working cylinder formed in said housing, a hammer piston reciprocable in said working cylinder under the action of pressure fluid, a member in which the occurrence of vibration is undesirable, said housing being slidably reciprocable a limited distance relative to said member in a feeding direction, elastic fluid cylinder and piston means associated with said housing and said member and confining therebetween a first chamber for a first elastic fluid body for transmitting feeding force in said feeding direction between said member and said housing corresponding to the force produced by the pressure of said fluid on said cylinder and piston means, an inlet port communicating with a source of elastic pressure fluid, an outlet port communicating with the atmosphere, passages in said cylinder and piston means communicating said inlet port with said chamber in a first position of said piston means relative to said cylinder means, passages in said cylinder and piston means communicating said outlet port with said chamber in a second distinct position of said piston means relative to said cylinder means, intermediate positions of said piston means relative to said cylinder means in which said passages in the cylinder and piston means do not communicate said chamber with said inlet and said outlet ports, the arrangement being such that starting from said intermediate position said first position is reached when the transmitted feeding force is increased and said second position is reached when said transmitted feeding force is reduced whereas said passages remain substantially closed when said feeding force is maintained substantially constant.

6. In a percussion tool with vibration reduction, a cylinder housing, a working cylinder formed in said housing, a hammer piston reciprocable in said working cylinder under the action of pressure fluid, a member in which the occurrence of vibration is undesirable, said housing being slidably reciprocable a limited distance relative to said member in a feeding direction, pneumatic cylinder and piston means associated with said housing and said member and confining therebetween a first and a second chamber for compressed air bodies for transmitting feeding force in said feeding direction between said member and said housing corresponding to the differential in force produced by the compressed air in said bodies on said cylinder and piston means, an air magazine in said cylinder housing in unrestricted flow communication with said first chamber, said air magazine having a volume which is large relative to the swept volume of said piston means, a compressed air inlet port communicating with said chambers and a compressed air source, an outlet port in said cylinder and piston means communicating with said chambers and distinct from said inlet port, passages in said cylinder and piston means communicable selectively with said inlet and outlet ports in two distinct positions of said piston means relative to said cylinder means, and an intermediate zone between said distinct positions in which said passages are closed from communication with said inlet and outlet ports.

7. A percussion tool according to claim 6 in which a fine restricted passage is provided between said second chamber and said air magazine.

8. A percussion tool according to claim 6 in which a first and a second pair of chambers are provided and in which said first pair communicates with said air magazine.

9. A percussion tool according to claim 6, in which a first air magazine is provided for said first chamber, a second air magazine for said second chamber, and a fine restricted passage is provided between the two magazine.

10. In a percussion tool with vibration reduction, a cylinder housing, a working cylinder formed in said housing, a hammer piston reciprocable in said working cylinder under the action of pressure fluid, a handle member in which the occurrence of vibration is undesirable axially movable with respect to said cylinder housing, pneumatic cylinder and piston means associated with said housing and said member and confining therebetween a first and a second elastic fluid body for transmitting feeding force between said member and said housing corresponding to the differential in force produced by the pressure on said cylinder or piston means of the elastic fluid in said bodies, two piston rods carried by said handle member and each one carrying piston means, passage means in said piston rods for conveying pressure fluid to said working cylinder for reciprocating said hammer piston, and a main valve in said handle member for controlling the supply of pressure fluid through said piston rods to said working cylinder.

References Cited by the Examiner

UNITED STATES PATENTS

| | | | |
|---|---|---|---|
| 1,911,978 | 5/1933 | Uhler et al. | 91—283 |
| 2,100,541 | 11/1937 | Gartin | 91—283 |
| 2,927,593 | 3/1960 | Hall et al. | 91—387 |
| 3,010,431 | 11/1961 | Holdo | 173—162 |

FOREIGN PATENTS

| | | |
|---|---|---|
| 927,902 | 6/1963 | Great Britain. |
| 847,324 | 9/1960 | Great Britain. |

EDGAR W. GEOGHEGAN, *Primary Examiner.*

PAUL E. MASLOUSKY, *Examiner.*